July 5, 1938.   W. H. PETIT ET AL   2,123,151
METHOD OF PHOTOGRAPHICALLY RECORDING VOTING MACHINE INDICATIONS
Filed Aug. 13, 1934   8 Sheets-Sheet 1
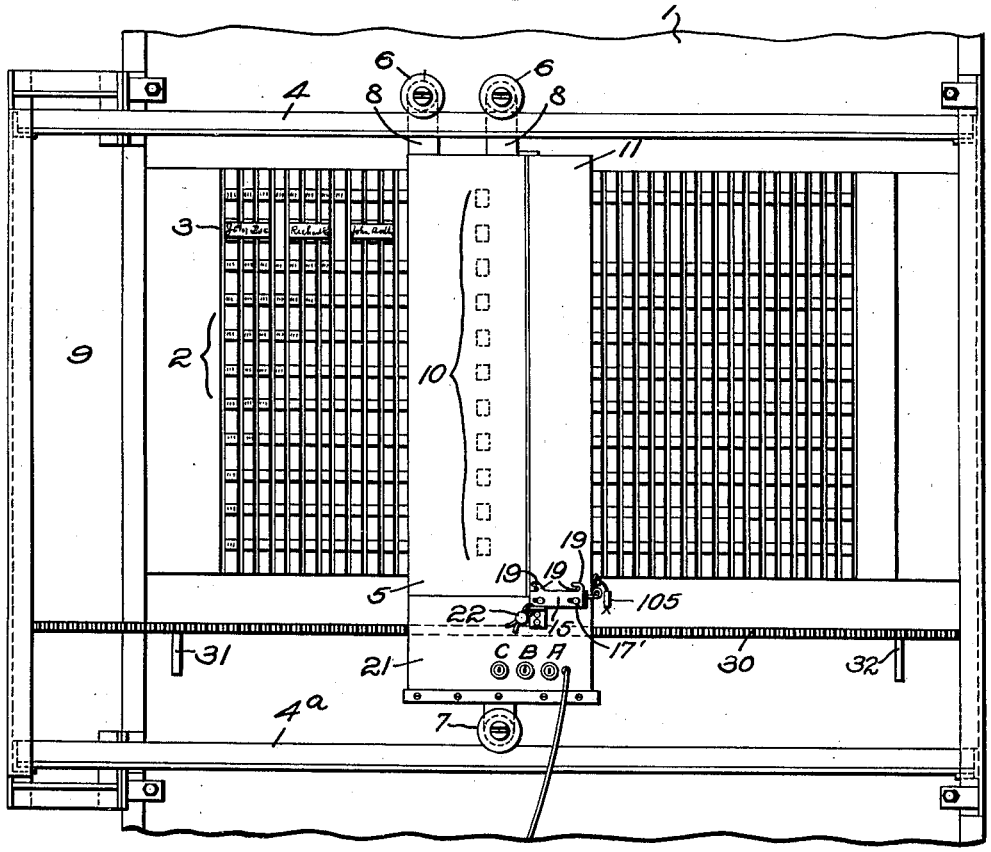
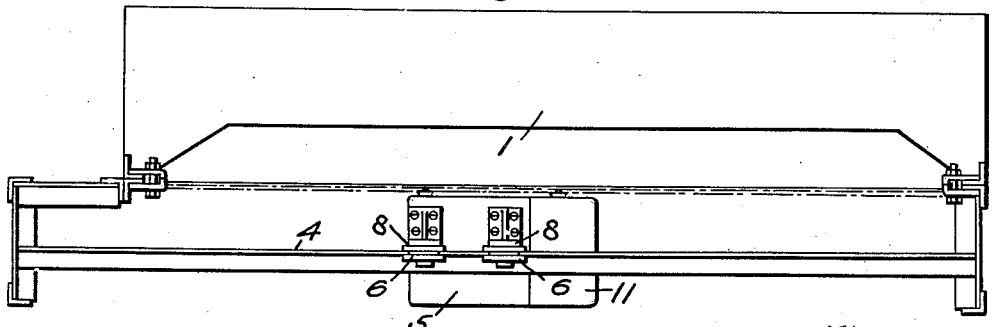
Inventors:
William H. Petit,
Edson S. Hineline.

July 5, 1938. W. H. PETIT ET AL 2,123,151
METHOD OF PHOTOGRAPHICALLY RECORDING VOTING MACHINE INDICATIONS
Filed Aug. 13, 1934 8 Sheets-Sheet 2

Inventors:
William H. Petit.
Edson S. Hirveline,

July 5, 1938.   W. H. PETIT ET AL   2,123,151
METHOD OF PHOTOGRAPHICALLY RECORDING VOTING MACHINE INDICATIONS
Filed Aug. 13, 1934   8 Sheets-Sheet 3
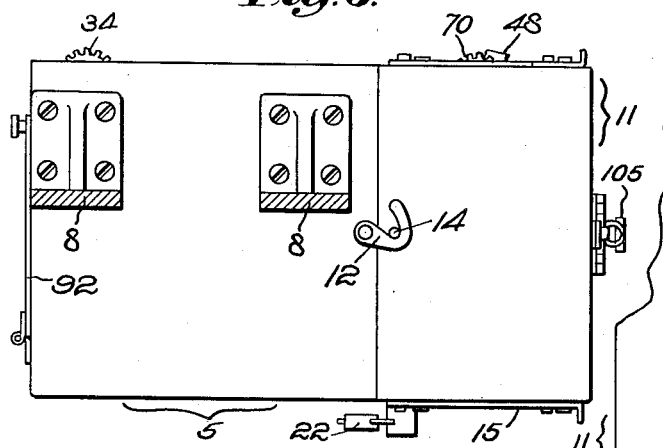
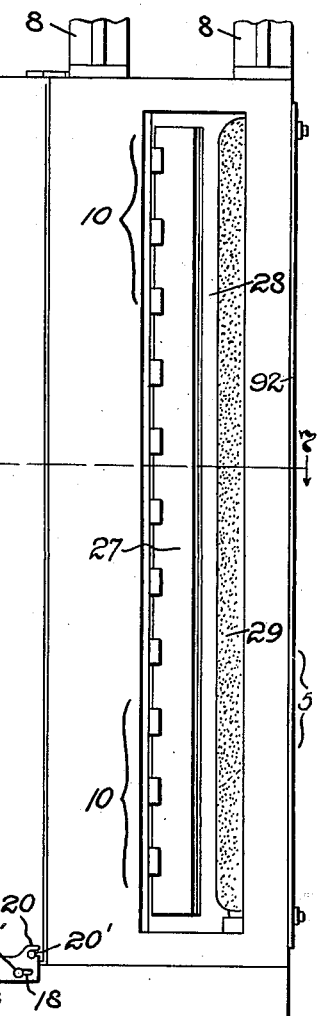
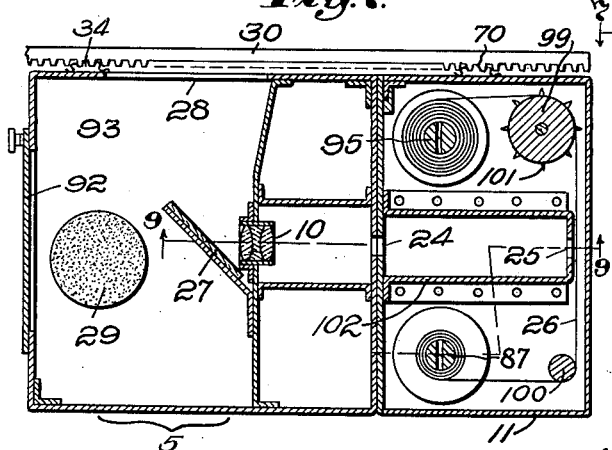
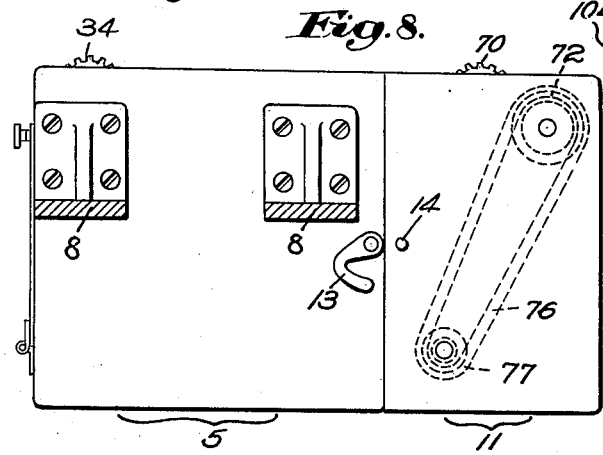
Inventor:
William H. Petit,
Edson S. Hineline,
by Emery, Booth, Varney & Townsend
Attys

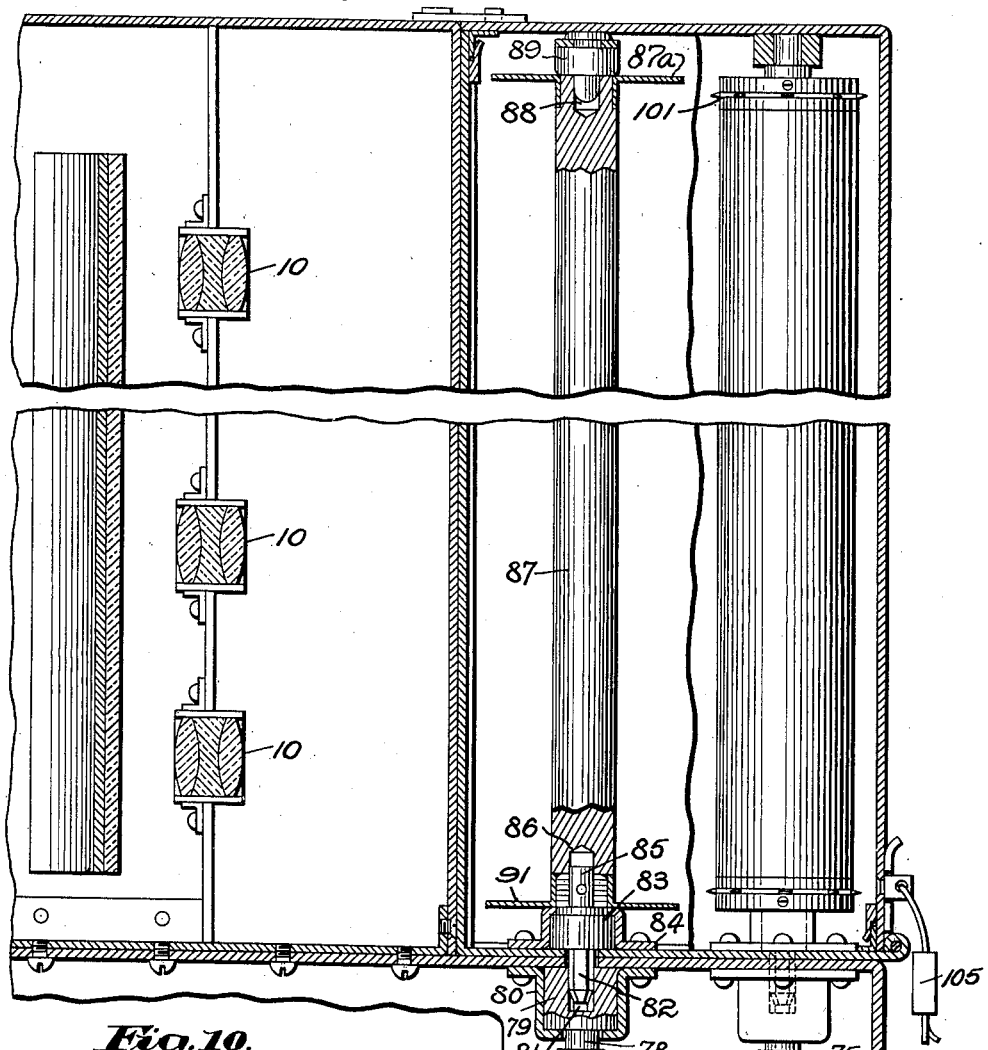
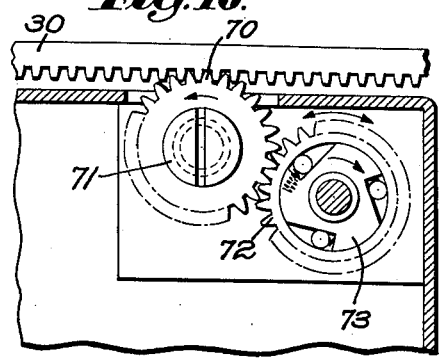

July 5, 1938. W. H. PETIT ET AL 2,123,151
METHOD OF PHOTOGRAPHICALLY RECORDING VOTING MACHINE INDICATIONS
Filed Aug. 13, 1934 8 Sheets-Sheet 5
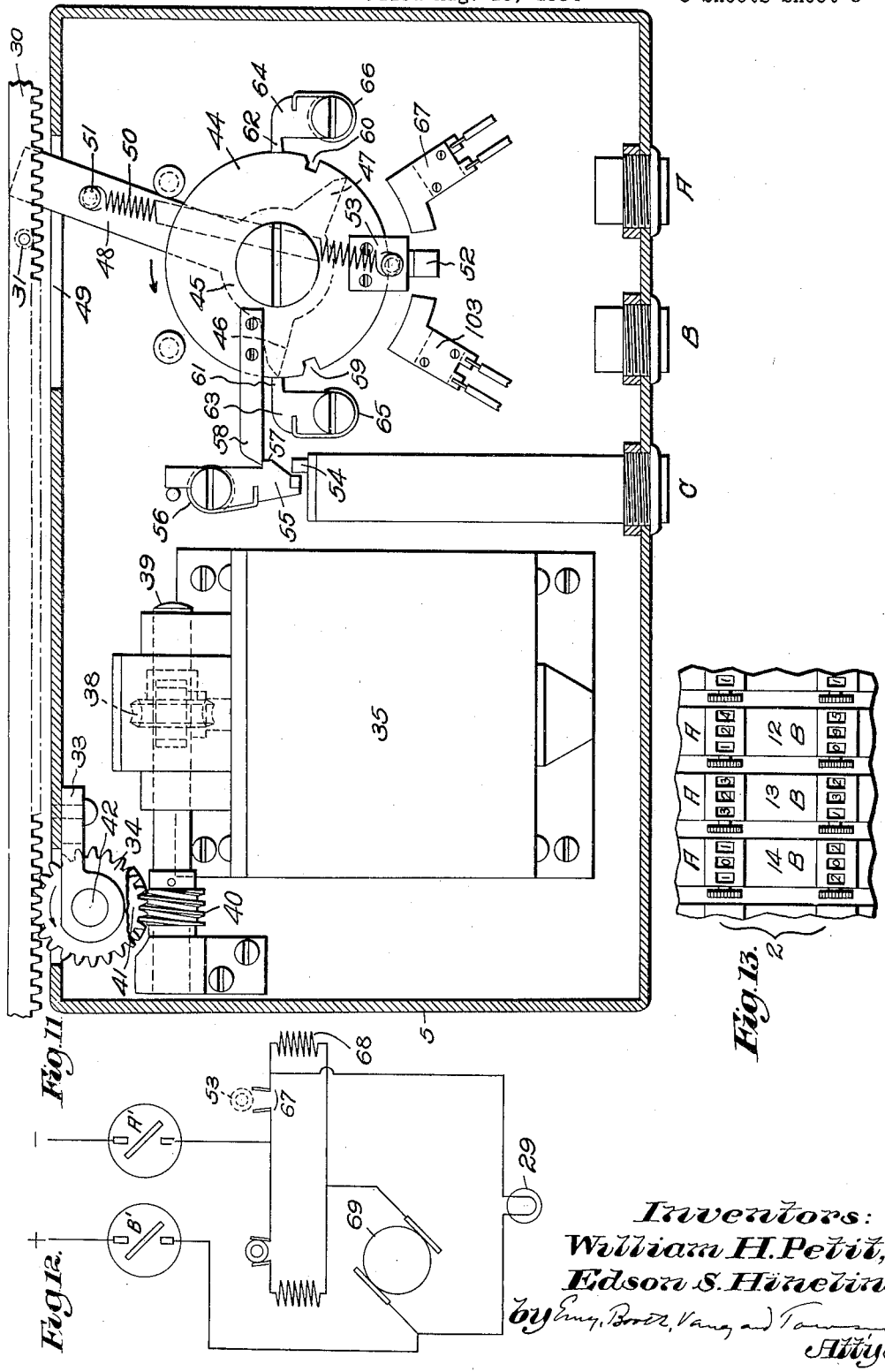

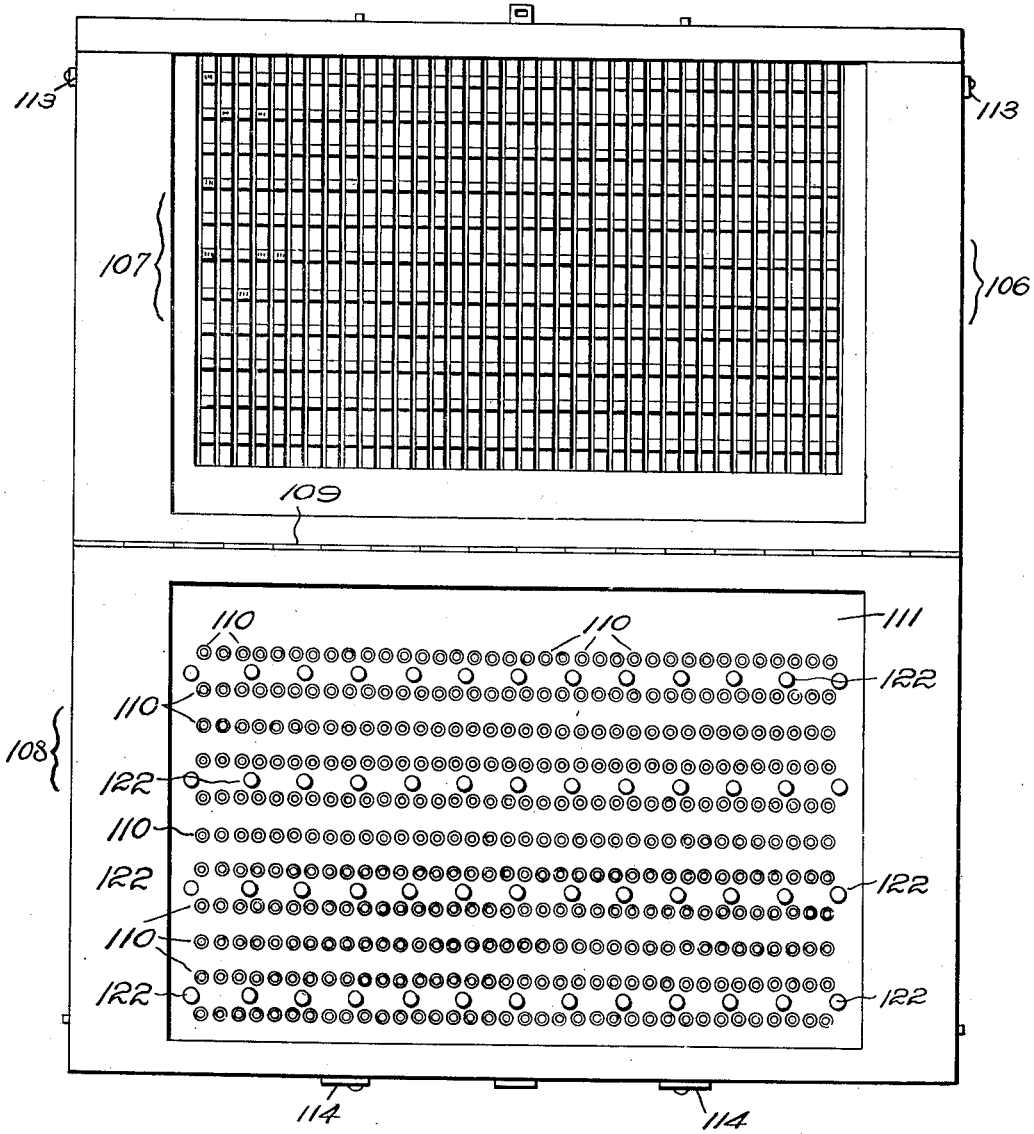

July 5, 1938.  W. H. PETIT ET AL  2,123,151

METHOD OF PHOTOGRAPHICALLY RECORDING VOTING MACHINE INDICATIONS

Filed Aug. 13, 1934  8 Sheets-Sheet 7

Inventors:
William H. Petit,
Edson S. Hineline,
by Emery, Booth, Varney and Townsend
Attys.

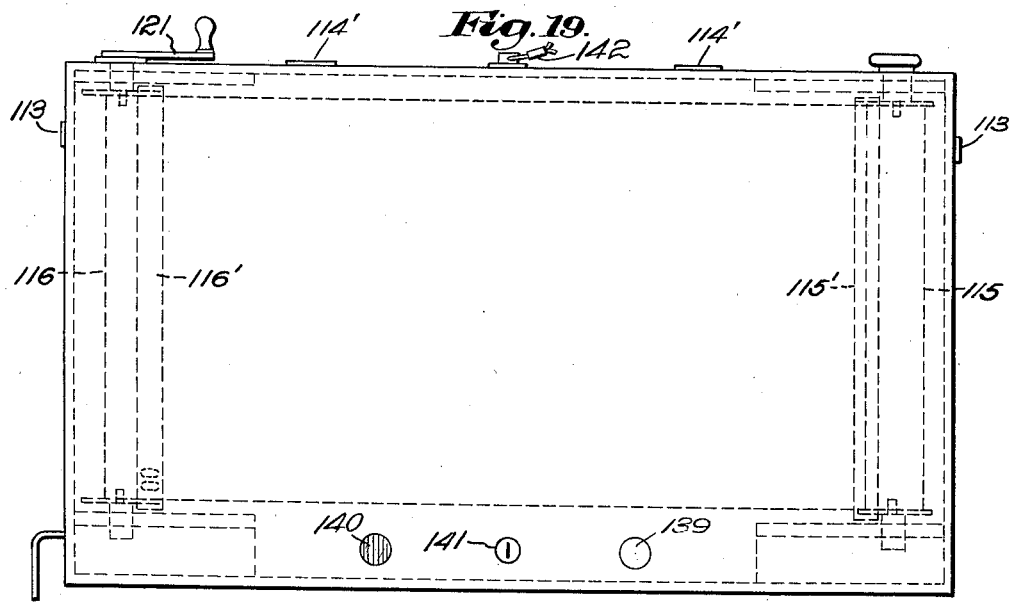
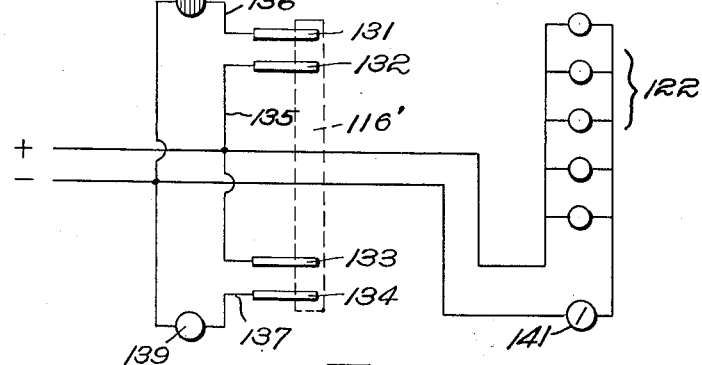
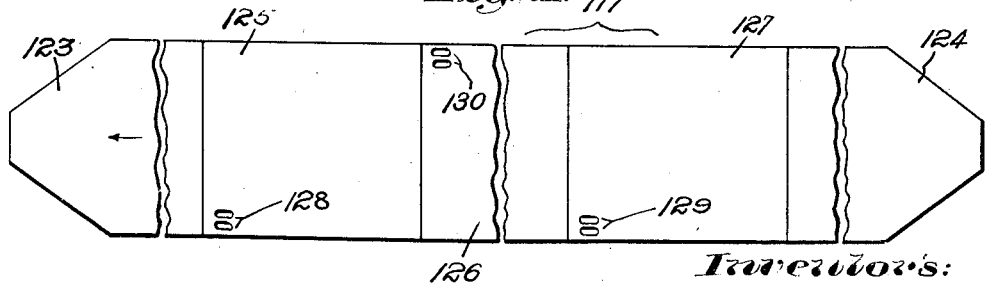

Patented July 5, 1938

2,123,151

UNITED STATES PATENT OFFICE 2,123,151

METHOD OF PHOTOGRAPHICALLY RECORDING VOTING MACHINE INDICATIONS

William H. Petit, Dayton, Ohio, and Edson S. Hineline, Rochester, N. Y., assignors to Folmer Graflex Corporation, Rochester, N. Y., a corporation of Delaware Application August 13, 1934, Serial No. 739,574

2 Claims. (Cl. 235—50)

This application is a continuation as to common subject-matter of our co-pending application Ser. No. 653,426, filed January 25, 1933, now Patent No. 1,977,453, dated October 16, 1934.

This invention relates primarily to photographic methods and more particularly to the method of photographically recording the actual vote-indications appearing upon voting machines, preferably showing the indications, if any, upon the reading, register, or meter or indication-displaying portion of the voting machine prior to the use of that machine for some particular occasion, and also after the use of the said voting machine upon that particular occasion, in order that no change may be made in the machine after the close of the voting without detection by the photographs, and also in order that the indications may be made a matter of permanent record by reason of said photographs.

In the carrying out of our method we may employ any apparatus that is found suited for the purpose. Preferably, however, and referring to the herein specifically disclosed purpose of our invention, the apparatus or mechanism should be such that it may be supported in close proximity to the voting machine in order that the existing indications upon the machine may be photographed of a sufficiently large size to be readily used without enlargement.

Most voting machines used at the present day are relatively large structures, sometimes more than six feet in height and relatively broad and having a very large number of indications at one face thereof, usually the face or part that is displayed to the voters when they approach the machine to vote by moving some part at each place where the names of a group of candidates for some office are displayed.

In our said original application of which this is a continuation, we have disclosed certain mechanism which is adapted to be supported in close proximity to the voting machine and which is capable of making a photographic reproduction of all the indications of registers, meters or readings, however numerous they may be. This we accomplish by providing the camera with a series of lenses arranged in a bank or row all with their axes in parallelism so that they are all directed at the same angle toward the said object-surface, and so that each lens of the series functions only with respect to a single transverse zone of the surface to be photographed, and whereby the said lenses collectively function with respect to the entire object-surface by blending their said zones. We also relatively traverse the said object-surface (namely, the voting machine) and the photographic apparatus.

In practising our method viewed in its specific aspect or purpose, we have obtained the best results by providing such a bank or series of lenses and by relatively traversing the photographic apparatus and the voting machine (preferably by moving the photographic apparatus across the register or like displaying face of the voting machine while feeding a sensitized film at the same rate), but our invention is not limited to the use of apparatus having such features inasmuch as so far as we are aware we are the first to photograph the indications upon a voting machine. While the method of our invention may be practised by the use of different mechanisms or apparatus, we will for convenience of description describe the method as practised by an apparatus such as disclosed in our said copending application Ser. No. 653,426, now Patent No. 1,977,453, inasmuch as the same discloses the best means known to us for practising our said method; we will also describe a different or alternative apparatus by which the method may also be practised.

Therefore, we will first proceed to describe such portions as may be necessary of the said mechanism or apparatus and explain how our method is carried out by the use of such apparatus. Said apparatus to the extent necessary is shown in the accompanying drawings, wherein—

Fig. 1 is an elevation of a part of the back of a voting machine having the photographic mechanism for practising our method applied thereto;

Fig. 2 is a plan view of the structure shown in Fig. 1;

Fig. 5 is a front elevation of the structure shown in Fig. 3;

Fig. 6 is a top plan view thereof but with certain of the parts shown in transverse section;

Fig. 7 is a view in transverse section upon the line 7—7, Fig. 5;

Fig. 8 is a bottom plan view thereof;

Fig. 9 is a vertical section with parts broken away upon the irregular line 9—9 of Fig. 7;

Fig. 10 is a transverse section upon the line 10—10 of Fig. 9 and looking downward in that figure;

Fig. 11 is a horizontal section of the lower part of the structure shown in Fig. 4;

Fig. 12 is a diagrammatic representation of the electric circuit employed in the use of the apparatus;

Fig. 13 is a detail in elevation of a small portion of the back of the voting machine, to indicate the general character of the structure that is to be photographed by the said apparatus.

In Figs. 14 to 21 inclusive, we have shown a different or alternative apparatus by which our method may also be carried out, and wherein—

Figure 15:
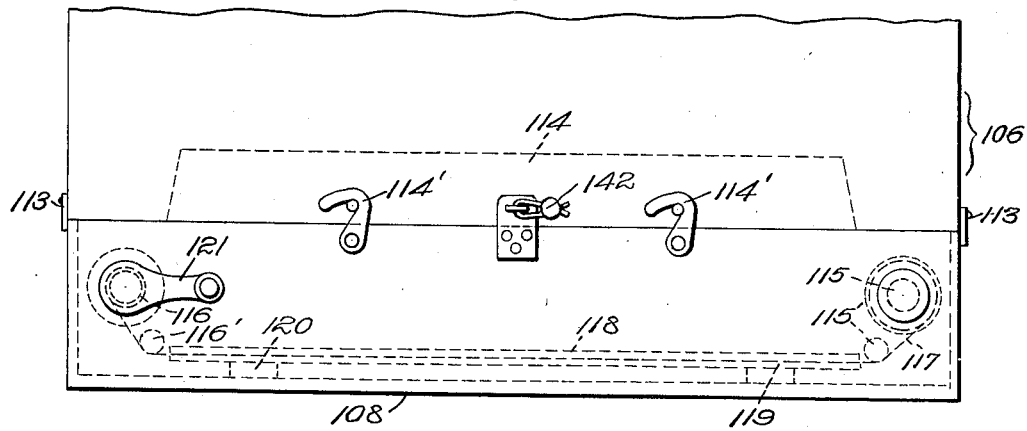
Figure 16:
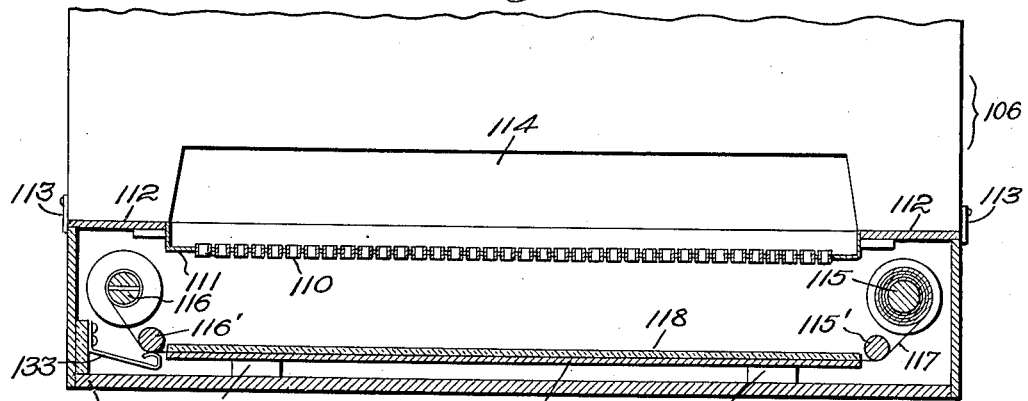
Figure 17:
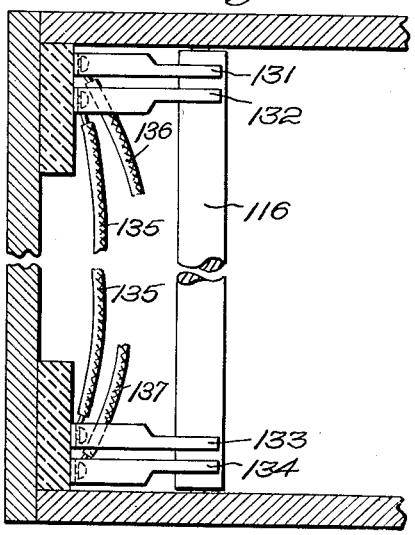
Figure 18:
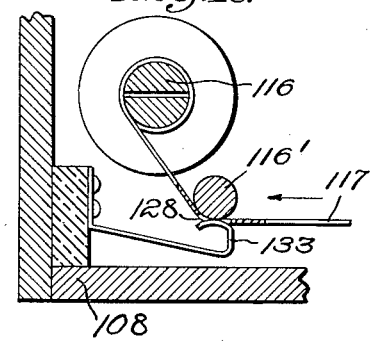

Fig. 14 is an elevation of the back of the voting machine having hingedly connected thereto a photographic apparatus stationarily mounted upon the voting machine, said apparatus in this figure being represented as turned downward into non-functioning position;

Fig. 15 is a detail showing in plan a part of the top of the voting machine and the photographic apparatus in functioning position at the back of the voting machine;

Fig. 16 is a view partly in horizontal section of the parts shown in Fig. 15;

Fig. 17 is a detail in transverse section looking forward from the back of the voting machine and showing the take-up roll and the contact members;

Fig. 18 is a detail upon a larger scale of the lower left hand corner of the structure shown in Fig. 16;

Fig. 19 is a view looking at the back of the entire apparatus with the photographic apparatus in functioning position;

Fig. 20 is a diagram to show the wiring by means of which the multiplicity of lamps for the lenses are caused to function and by which the warning white and red lights are caused to function; and Fig. 21 is a plan view partly broken away, to show the sensitized sheet of film used in carrying out our method with the second form of apparatus shown.

In carrying out our method in its most specific aspect, we preferably so photograph the face or part of the voting machine having the vote indications that the figures or lettering or other indications may be easily read in the photograph without enlargement, and this we do by making the photographic exposure at a very short distance from the face or part of the voting machine having said indications.

Referring first to Fig. 1, the back of the voting machine is indicated at 1. Upon the back are a series of readings generally indicated at 2 in Fig. 1, and also in Fig. 13 in detail. The readings consist of numerals upon the peripheries of sets of disks, each set of disks indicating the total number of votes for one person or subject-matter. We preferably provide means whereby the inspectors of elections may write their names at some point at the back of the voting machine, and at 3 in Fig. 1 we have indicated the names of three inspectors. This is intended as a safeguard, and it is pointed out that when the photographs are taken, they are in a sealed receptacle and are delivered in such sealed receptacle to some suitable place for development. Prior to the development of the pictures of all the voting machines of a city or locality, it would not be known to which voting machine the respective films pertain. This would eliminate one opportunity for fraud.

Upon the back of the voting machine we position an upper and a lower track 4, 4a, and the photographic apparatus which is indicated generally at 5 in the several figures is provided with two upper rolls 6, 6 and a lower roll 7, all suitably carried by brackets or members 8, 8, 8, shown most clearly in Fig. 1.

The voting machine should be provided with a lateral extension 9 in front of which the tracks 4, 5 extend, the purpose being to afford means to support the photographic apparatus at one side of the voting machine and thus to leave all of the back of the said machine open to inspection.

The photographic apparatus itself may be of various shapes and sizes according to the size or shape of the sheet or surface that is to be photographed. We have herein represented the same as of a general upright oblong shape, the height or length thereof being somewhat in excess of the height of that part of the back of the voting machine having all the readings of the voting.

Referring to Fig. 1, it will be observed that there are eleven sets of readings in each vertical tier. We accordingly provide eleven lenses indicated at 10 in the several figures, each lens being so positioned as to take care of all the readings which are at the same level entirely across the back of the voting machine. Thus, with eleven sets of readings in each vertical tier, there are provided eleven lenses 10. This number will, of course, be varied or changed to suit other conditions or other sheets or surfaces to be photographed. So far as we are aware, we are the first to photograph at very close quarters a relatively large surface by employing a series of lenses, all for making a single picture. In this disclosed embodiment of means for practising the invention, the photographic apparatus is in motion across the back of the voting machine while the exposure is being made, and so far as we are aware we are the first to provide a series of lenses cooperating in the photographing of a surface by a single exposure while using a series of lenses.

While the shape and size of the photographic apparatus are determined by the particular requirements of the case, it is an important feature of the invention to provide a magazine which may be sealed against tampering, said magazine containing the sensitized surface or film and suitable supporting means therefor. Such magazine is in accordance with our invention removed in its sealed condition from the camera or photographic apparatus, and transmitted to the place where the sensitive surface or film is to be developed.

While the magazine or sealed receptacle may be variously constructed, we have in several figures indicated the same generally at 11. Viewing Fig. 3, which is a side elevation, Fig. 6, which is a plan, and the other views showing the magazine or sealed receptacle, it will be evident that the top of the body portion 5 of the photographic apparatus is provided with a hook 12 and the bottom is provided with a hook 13 for engagement with pins 14. Also, as evident from Figs. 3 and 5, there are provided near the lower end of the magazine two opposite slides 15, 16, having slots 17, 18 receiving pins 17', 18' permitting the said slides to be moved to engage or disengage by their ears 19, 20 the pins 19', 20' which are on the side and back of the magazine. The slides 15, 16 are themselves supported by the pins 17', 18' and their slots, upon the lower or base portion 21 of the photographic apparatus, and seals are provided, one of which is indicated at 22, to secure the slides in position, thus locking the magazine to the camera or body portion 5 thereof. In order to remove the magazine, it is necessary to destroy or break the seals 22 for the two slides 15, 16 so as thereby to release the slides 15, 16, and this is done only by authorized persons.

It will be observed that in this embodiment of the sealed package there exists an entirely closed receptacle having the described pins by which the magazine is held or secured in position for use. The receptacle is also provided with a lengthwise slit 24 indicated also in section in Fig. 7, and through which and the similar slit 25 the image or picture is transmitted to the film indicated at 26. In said Fig. 7, one of the lenses is indicated at 10 and in the rear thereof is the inclined mirror 27. The image is transmitted to the mirror 27 through the relatively wide vertical opening 28 in the wall of the camera body 5, the said opening 28 being indicated upon a larger scale in Fig. 5. In the rear of the mirror 27 is positioned the light 29 which is preferably a long bulb of the entire height of the photographic apparatus or at least so much of the height as is comprehended by the entire bank or set of lenses 10.

It is to be understood that in this disclosed embodiment of our invention the picture or exposure is to be made while the camera or photographic apparatus 5 is traveling across the back of the voting machine. This is accomplished by moving the photographic film at the same rate at which the receptacle or apparatus 5 travels, thus providing relatively stationary parts.

In order to prevent fraud, it is necessary to photograph the voting machine (in this case, the back thereof) before the voting begins and to photograph the same again after the voting is ended. Thus a comparison may be made of the two impressions or pictures and the difference in the readings of the different units or disks in the two pictures would be the total votes.

If no photograph were taken of the voting machine before the voting began, it is evident that fraud could be perpetrated by turning the readings at some of the disks in such a way as to cause a misrepresentation of the total vote of some candidate or candidates. For example, a fraudulent result might be indicated in the following manner.

Viewing Fig. 13, it will be evident that the three disks indicate units, tens and hundreds, and that first the unit disk and then the tens disk and then the hundreds disk are turned until 999 are indicated, whereupon the readings begin again at 1 on the unit disk. If the disks of one set be turned prior to the voting so as to indicate 925, and this fact be not known, it is evident that as soon as that candidate has received 75 votes, his set of disks immediately begins to register again at 1, whereas the other candidates who may be assumed to be receiving substantially as many votes would have a reading or register of 75 votes. In other words, one of the candidates has been handicapped to the extent of 75 votes.

All this is avoided by making the photographic reading of all the voting indications or disks of the voting machine before the voting begins, and again photographing the same field or surface after the voting ends and then making a comparison of the two photographs.

In the practice of our method as herein specifically set forth with relation to an important field of use of the method, the photographic apparatus 5 will be first positioned at the extreme left side of the back of the voting machine viewing Fig. 1, that is, directly in front of the extension 9 so that all of the counting or indicating disks 2 are exposed to view.

The photographic apparatus 5 is provided with means (preferably an electric motor) by which it is automatically moved across the back of the voting machine, taking the picture of the back of the voting machine during the travel of the photographic apparatus 5, which at the end of its travel toward the right viewing Fig. 1 will automatically reverse its direction of travel and return to its initial position at the extreme left of Fig. 1, during which reverse travel no picture will be taken, as will be explained. This will, when the film is developed, give a photographic reproduction of the back of the voting machine before the voting begins. At the close of voting this same operation is repeated so that a picture is made of the back of the voting machine at the termination of voting.

In order that the photographic apparatus 5 may not be moved from its position of rest at the extreme left of Fig. 1 until started by authorized persons, such as the supervisors of elections, we have provided the following structure or mechanism as one embodiment only of means for controlling the travel of the photographic apparatus 5.

Figure 3:
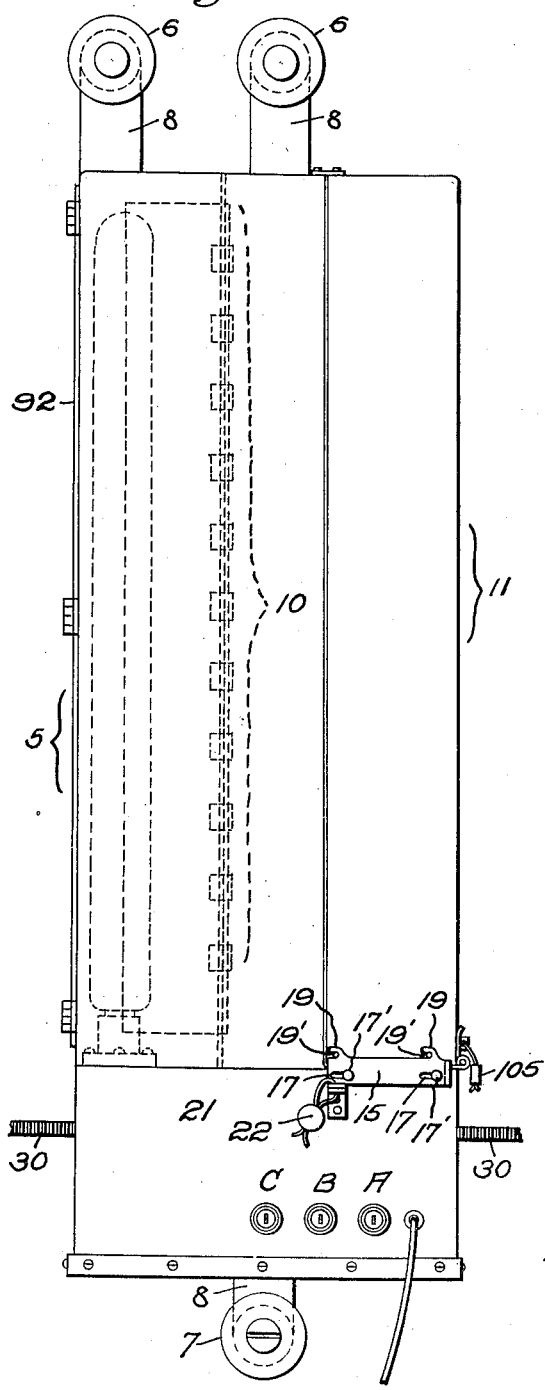
Fig. 3 is a rear elevation of the photographic apparatus including its magazine.

Viewing Figs. 1, 3 and 11, it will be observed that there are three apertures or key holes A, B, C. The keys for these three different apertures must differ among themselves to ensure the utmost safeguarding. They are intended to be in the sole custody of three different election inspectors or officials, of, say, the three leading parties. It is necessary therefore for the three keys to be inserted and turned before the motor can begin to run or function.

Referring briefly to Fig. 12, where the electric circuit is diagrammatically indicated, it will be seen that the two keys A, B, when turned, turn the switches A', B' shown in Fig. 12, so as to complete the circuit. The photographic apparatus 5, however, cannot begin its travel from left to right viewing Fig. 1 until the third key is inserted in the key hole C, inasmuch as an operating cam or member having an arm that protrudes through an opening in the side of the sealed magazine or receptacle cannot be moved to pass a starting pin, as will now be explained.

Referring to Figs. 1 and 11, it will be noted that there is a rack 30 mounted or supported across the back of the voting machine below all the indicating or counting disks 2, and preferably spaced only a few inches therefrom. The said rack 30 is provided with a starting pin 31 and a reversing pin 32.

The film and its let-off and take-up rolls are mounted in the sealed magazine or receptacle 11 which is to be opened only by an authorized person, but the electric motor and its gearing are mounted in the basal portion of the apparatus 5, but so as to feed the film in the sealed magazine 11. Viewing Fig. 11, it will be noted that a bracket 33 is secured to the inside of the basal part of the apparatus 5 and has a bearing upon which is mounted a small pinion 34 meshing with the teeth of the rack 30. Assuming that the photographic apparatus 5 is initially positioned at the extreme left of Fig. 1, so that said apparatus is about to travel to the right across the back of the voting machine, if the pinion 34 be rotated contraclockwise as indicated by the arrow in Fig. 11, the result will be to traverse the said photographic apparatus 5 toward the right viewing Figs. 1 and 11, along the rack 30. In order to rotate the pinion 34 in the direction stated (and in the reverse direction when the motor is reversed), the motor, which is merely diagrammatically indicated at 35 in the several figures, is provided with a drive shaft 36, a worm 37, whereon meshes with a worm wheel 38 upon a worm shaft 39 carrying at its opposite end a worm 40 meshing with a worm wheel 41 upon an upright shaft 42 whereon is fast the said pinion 34.

The controlling or governing means for the travel of the photographic apparatus 5 is represented in neutral position in Fig. 11.

Viewing Fig. 11, it will be noted that upon a stud 43 in the basal portion of the apparatus 5 there is loosely mounted a so-called floating disk 44 co-axial with which, but free to move relative thereto, is an operating cam member 45 having two radial projections 46, 47 and an arm 48 extending out through a slot 49 in the wall of the basal part of the apparatus 5. The said arm 48 occupies, when the camera is positioned at the extreme left in Fig. 1, the position shown in Fig. 11, inasmuch as when the photographic apparatus 5 was last previously used, or in placing the same in position for use, the same arm 48 contacted with the pin 31 on the rack 30 and was thereby moved into its position to the right of the center of said floating disk 44, from its previous position to the left of the center of said disk. In such position of the arm 48 a coil spring 50 connected at one end to a pin 51 on the arm 48 and at its other end to a pin 52 on a block or switch 53 upon the floating disk 44, being thus positioned past the center of the floating disk, acts or tends to move the said arm 48 as well as the cam 45 and the floating disk 44 from the neutral position shown in Fig. 11 to the forward driving position. This, however, cannot take place until the third key has been inserted in the third keyhole C.

Viewing Fig. 11, which is the neutral position, it will be noted that the barrel or member which is turned by the key inserted in keyhole C, has a projection 54 which, when the barrel or member is turned by the key, moves so as to swing a latch or detent 55 clockwise viewing Fig. 11. The said detent 55 is provided with a spring 56 coiled about its pivot and tending normally therefore to hold the said detent toward the right viewing Fig. 11. The said detent is provided with a shoulder 57 which, as shown in Fig. 11, takes under the end of a rigid arm 58 secured to and extending laterally from a face of the floating disk 44. The turning of said detent 55 in a clockwise direction releases the arm 58 and therefore permits the coiled spring 50 (which, as stated, is connected at its lower end to the floating disk 44) to pull or draw said floating disk slightly in a contra-clockwise direction so as to bring it from the neutral position to the forward driving position. The said mechanism or a part thereof constitutes an interlock which is controlled by human element, namely, the insertion of a key in keyhole C. The picture taking occurs as the camera moves from left to right. Such picture taking cannot occur until that interlock has been so acted on by a key inserted in the keyhole C that the camera is then automatically moved from left to right. Therefore, voting cannot be done until the first picture has been taken. The picture is taken while the camera is moving to the right, and when the camera is moved fully to the right, it automatically reverses and returns to its initial position at the left and during said movement to the right the first picture is taken.

The said floating disk 44 is provided with two peripheral notches 59, 60 adapted to be entered by the ends 61, 62 of two detents 63, 64 pivoted upon the wall of the basal part of the apparatus 5 and provided with coiled springs 65, 66, tending to move said detents inwardly.

The movement of the arm 48 of the cam 45 into the position shown in Fig. 11 for the commencement of the operation, causes the radial projection 46 of the cam 45 to engage the nose 61 of the detent 63 and thus crowd it out of the peripheral notch 59 of the floating disk 44. This leaves the said floating disk 44 free to be turned slightly circumferentially by the upward pull of the spring 50 as already described, inasmuch as at this time the nose 62 of the detent 64 is not in the notch 60.

The upward pull of the coiled spring 50 not only turns the floating disk 44 slightly in a contra-clockwise direction but in so doing moves the block or switch 53, causing said block or switch 53 to bridge or close the gap 67 in the circuit indicated in Fig. 12.

By thus completing the circuit (the keys for the key-holes A and B, having already been used to turn the parts A', B' from their neutral position shown in Fig. 12), the circuit is established through the forward field 68 of the motor, and the armature 69, as well as the electric light 29, so that the motor being forwardly driven moves the photographic apparatus 5 including the sealed receptacle 11 from its position of rest at the left hand side of the voting machine viewing Fig. 1, toward the right hand side thereof. It has been stated that the electric light or lamp 29 is energized by the forward driving of the motor. The photographic apparatus is preferably not provided with a shutter and therefore a continuous exposure is made during the entire travel of the photographic apparatus 5 across the back of the voting machine when traveling toward the right viewing Fig. 1.

It is therefore necessary to provide means to feed the film past an exposure opening therefor at precisely the same speed at which the photographic apparatus travels across the back of the voting machine. While this may be accomplished in many different ways, we have shown the following means.

As shown most clearly in Figs. 7, 8, 9 and 10, there is mounted inside the basal portion of the apparatus 5 a small pinion 70 which meshes with the rack 30 and is of the same diameter and number of teeth as the pinion 34 shown in Fig. 11. The said pinion 70 is mounted upon a stud 71 and meshes with a pinion 72 of equal diameter, which, as most clearly shown in Figs. 9 and 10, is provided with a tapered ball clutch drive 73. As shown most clearly in Fig. 9, the shaft or spindle 74, whereon is the pinion 72, has fast thereon a small pulley 75 to receive a driving band or belt 76 preferably of coiled wire which will permit slippage if necessary. Said band 76 extends about another pulley 77 as shown in Fig. 9. The said pulley 77 is fast upon a stud shaft 78 having a head or enlargement 79 received or supported within a cap or enclosure 80 secured to the outside of the wall of the basal portion of the apparatus 5. Said head 79 is provided with an axial socket 81 polygonally shaped or splined to receive a similarly shaped axial extension 82 of a stud whose head is shown at 83. The head 83 is itself mounted within a cap or enclosure 84 secured to the inner side of the sealed magazine or receptacle 11. Said stud has upwardly extending from its head a pin 85 which is located to enter the socket 86 in the lower end of the take-up spool 87 which at its upper end, as shown most clearly in Fig. 9, is provided with a flange 87a and an axial socket 88 to receive a pin 89 supported by the pivoted bracket or member 90. Said take-up spool is also provided with a flange 91 at its lower end.

This or any other suitable construction may be provided to constitute the take-up spool or member onto which the film 26 is constantly wound during the travel of the photographic apparatus 5 described, said film being best shown in position in Fig. 7.

Figure 4:
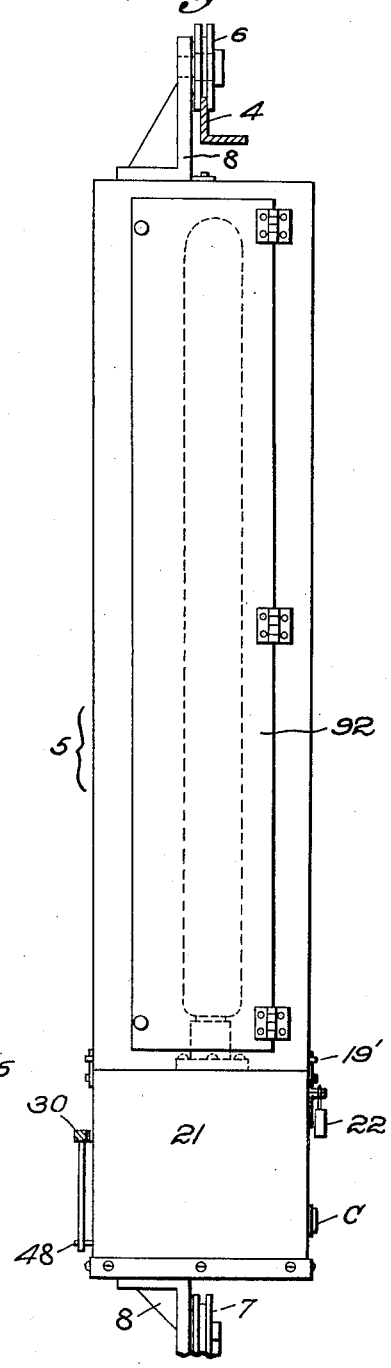
Fig. 4 is a side elevation of the structure shown in Fig. 3.

The upright portion of the photographic apparatus 5, which contains the lamp 29, mirror 27 and the bank of lenses 10, is provided with a door 92 shown most clearly in Figs. 4 and 7, which is suitably equipped to prevent the admission of light into the chamber 93 of the said apparatus 5.

It will be understood that the sealed receptacle 11 may, by the properly authorized person, be removed from the basal portion of the apparatus 5, the driving connection shown in Fig. 9 being readily separable.

The film 26 is a sensitized film of any suitable character and provided as a sealed roll to be positioned as the let-off roll. As shown in section at 95 in Fig. 7, the said let-off roll is suitably supported at its ends. We may provide a spring to bear upon the film as it is drawn or let off during the travel of the camera.

The film is positioned in any suitable manner, as by unsealing the end of the film roll, then placing the roll in position as indicated at 95 in Fig. 7, then drawing the leading end of the film about the measuring roll 99, then about the guide roll 100 and then securing the leading end of the film to the take-up roll 87 which, as described, is the driven roll of the film feeding mechanism.

The measuring roll 99 is provided with spurs 101 to engage suitable marginal openings in the film and thereby insure the positive feeding of the film. Within the sealed magazine or receptacle 11 there may be provided a suitable wall 102 shown in Fig. 7 as of general U shape in transverse section, said wall having the opening 25 across which the film is fed at precisely the same rate of speed as the travel of the photographic apparatus 5 past the back of the voting machine.

Due to such fact of equalities of speeds a continuous exposure is made through the opening 28, the image being reflected by the mirror 27 through the entire bank of lenses 10 onto the film 26, which thus receives the impression of the entire back of the voting machine.

In the apparatus herein shown, no shutter is employed since the lamp or electric light 29 is functioning only during the forward direction of travel of the photographic apparatus (that is, toward the right in Fig. 1), and moreover, there is no feeding movement of the film during the return travel of the photographic apparatus 5 to the left viewing Fig. 1. The current passes through the lamp 29 when the motor is forwardly driven, but during the reverse driving of the motor the lamp 29 would be but very dimly functioning if at all, and if no shutter be employed there would at the most be merely a dark vertical line in the exposed film at the end of the first exposure.

We may provide a shutter which is automatically opened at the precise instant of the commencement of the travel of the voting machine from left to right viewing Fig. 1 and which is held open until the travel toward the right is completed, when the shutter is automatically closed and remains closed until another exposure is desired.

When the photographic apparatus 5 reaches the limit of its travel towards the right viewing Fig. 1, the arm 48 strikes the reversing pin 32 which moves the arm 48. The shifting of the arm 48 brings the coiled spring 50 to a position at the left of the pivot of the floating disk 44. The result is that the upward pull of the spring 50 in its new position tends to pull the switch or block 53 into position to close or bridge the gap at 103. The shifting of the arm 48 causes the radial projection 47 of the arm 45 to engage the detent 64 and push the same out of the notch 60. This permits the spring 50 to function as described and by its upward pull to move the floating disk 44, at which time the detent 63 instantly enters the notch 59 and holds the floating disk in its new position. This position is maintained throughout the return movement of the photographic apparatus 5 to the extreme left viewing Fig. 1.

It will be understood from the foregoing description of the construction and operation, that the film is at all times during the taking of the pictures sealed within the magazine or receptacle 11 (but is driven from the motor within the basal part of the apparatus 5). This is done through a third slide 104 indicated in Figs. 3 and 5 as at the front of the receptacle or magazine 11. The said slide or latch is sealed by a seal 105 which is to be broken only by an authorized person, for removing the film after both exposures have been made and the development thereof.

In Figs. 14 to 21, we have shown a different or alternative apparatus by which our method may also be carried out.

In accordance with the method of our invention, whether practised by such a mechanism as shown in Figs. 1 to 14 or by such a mechanism as shown in Figs. 14 to 21, or practised by some other mechanism than those herein shown, we establish photographically the fact of, and preserve as a permanent accurate record, the exact number of votes that have been registered for each candidate and/or question voted on during a predetermined period of use of a voting machine by—(1) exposing for photographic purposes that face or part of a voting machine having indicators that separately register the votes for each candidate and/or question to be voted on at one election; (2) photographing said face or part of said voting machine just prior to the commencement of the said election, and desirably upon a single sensitized surface so as to show in their relative positions, all of said indicators, whereby the number of votes, if any, appearing upon any of said indicators may be ascertained for comparison and for permanent record by reason of said photographing; (3) again exposing for photographic purposes, immediately at the close of the election, the said face or part of the voting machine, and again photographing the same, preferably upon a single sensitized surface, so as to show in their relative positions, all of said indicators, whereby the number of votes appearing upon each of said indicators may be ascertained for comparison with said first exposure and also for permanent record by reason of said photographing; so that there may be deducted separately the number of votes, if any, for each candidate and/or question appearing on the indicators prior to said election, as shown by said first exposure, from the number of votes for the same candidates and/or questions appearing on the indicators, as shown by said second exposure, so as thereby to ascertain the total true vote for each candidate and/or question, and to preserve the permanent accurate photographic record thereof.

Other steps desirably practised in accordance with our method and including the signalling of the presence of sensitized areas and of non-sensitized areas in front of the lenses, are also set forth herein.

We will now proceed to describe specifically another form of mechanism or apparatus by which our said method may also be practised.

In Fig. 14, we have represented at 106 the back of a voting machine which may be of any construction but which, for convenience of description, may be regarded as substantially the same as that shown in Fig. 1. It is or may be provided upon its back with substantially the same series of readings generally indicated at 107 in Fig. 14, and thus consisting of numerals upon the peripheries of the respective disks, each set of disks indicating the total number of votes for one candidate or subject matter. Instead of providing means whereby the photographic apparatus may be moved across the voting machine during the taking of the desired photographs (namely, before and after the election), we attach the photographic apparatus to or mount the same fixedly upon the voting machine and preferably in such a manner that it may be moved sufficiently away from the face or part of the voting machine having the indicators or readings to permit access to said indicators or readings. For the purpose we have, as shown in Fig. 15, provided a photographic apparatus 108 of a box-like character having the same dimensions as to width and height of that portion of the voting machine where the indicators or readings are located. Preferably, we hinge the photographic apparatus 108 to the voting machine 107, as indicated at 109, so that the same may be unfolded down into the position shown in Fig. 14 or be folded up against the back of the voting machine, thus bringing the parts into relative position shown in Figs. 15 and 16.

While the number of indicators or readings of voting machines, of course, differ, we have in the case of the voting machine herein shown represented somewhat in excess of 400 indicators or readings. We accordingly provide in this type of apparatus a separate lens for each indication or reading, and have represented such lenses by rows of small circles 110 in Fig. 14. All of those lenses are mounted in a board 111, 112. We have provided hooks 113 by which such board may be secured in position against the back face of the voting machine 107, and to that end we provide a hinge shown at 109 in Fig. 14 for the lens board at its lower end. The lenses, although many in number, are comparatively inexpensive, as a single lens of pressed material is sufficient for the purpose. As shown in Fig. 16, the back of the voting machine may be recessed as indicated at 114, thus providing sufficient focal distance between the indicators or readings of said machine and the lenses 110, as, for example, about three inches, and about the same distance between the lens board and the film or paper. The box or receptacle or enclosure 108 is a complete closure excepting at the side where the lens board 111 is received and said receptacle 108 is adapted to be held in functioning position by hooks 114', shown most clearly in Fig. 15. Within the receptacle 108 are mounted upon vertical axes the let-off roll 115 and the take-up roll 116, shown most clearly in Fig. 16. They are adapted to receive the film 117 which in unwinding passes between a glass plate 118 and a metallic plate 119, preferably of some light material such as aluminum. Said plate 119 is supported in position by the members 120.

The let-off and take-up spools are desirably of usual character to be readily inserted and removed. While we may provide automatic means for feeding the film 117, as, for example a motor, more definitely referred to in connection with the form of apparatus shown in Figs. 1 to 13, and the operation of which is controlled by a clock, so that the sensitized paper or film may be fed so as to position a sensitized area thereof for photographic purposes in the morning before the election and again in the evening after the election, in the apparatus shown in Figs. 14 to 20, we have provided manual means for feeding the film. For that purpose, we have shown in Figs. 15 and 19 a hand crank 121 upon the take-up spool, so that the sensitized paper or film 117 may be moved at the necessary times for the purpose stated.

In the type of apparatus shown in Figs. 14 to 20 no shutter is necessary, but in order that light may be provided for effecting a proper exposure, we have, as shown most clearly in Fig. 14, provided a large number of very small electric light bulbs 122, which may be provided in a rectangular arrangement, as shown at the lower part of Fig. 14, or otherwise. For example, between every third and fourth lens just below the top row of lenses a small bulb 122 is provided and the bulbs are provided in the same arrangement after every third horizontal row of lenses as represented in Fig. 14. Of course, the number of lights will be such as is necessary to effect proper exposure. The said lights are all in circuit as hereinafter referred to and as diagrammatically indicated in Fig. 20.

Desirably and as an important feature of our method, we provide for signalling the presence of a sensitized area and also for signalling the presence of a non-sensitized area in front of the lenses, and to that end, we provide means whereby the feeding of the film, whether manually or automatically, will control two different lights, one being for the purpose of indicating that a sensitized area of the film is in position for a photographic impression to be made thereon, and the other light to indicate that a non-sensitized portion of the film is opposite the lenses 110. For this purpose, we desirably provide a photographic strip 117, shown most clearly in detail in Fig. 21, and the use of which in carrying out our method is not limited to the apparatus shown in Figs. 14 to 20. It is desirably provided with a leader end 123 of usual non-sensitized material and a similar trailer end 124. Succeeding the leader end is a sensitized area 125 which is itself succeeded by a non-sensitized area 126 of sufficient area to cover the entire face or part of the voting machine having the readings or indicators described. Following the area 126 is a second sensitized area 127 which is itself succeeded by the trailer end 124. The sensitized area 125 is provided with two openings 128 at any suitable point but desirably near one of the leading corners. At a similar position the sensitized area 127 is provided with like openings 129. The non-sensitized area 126 is provided with two like openings 130 but positioned at the opposite leading corner of the area from that at which the openings 128, 129 are provided.

Referring more particularly to Figs. 16, 17 and 18, it is noted that adjacent to and in parallelism with the rolls 115, 116, there are provided metallic rolls 115', 116'. The photographic casing 108 has secured in suitable position four contact fingers 131, 132, 133 and 134. The two contacts 132, 133 are connected by a wire 135. Leading from the contact 131 is a wire 136 and leading from the contact 134 is a wire 137, and in circuit therewith is a wire and plug 138 shown in Fig. 19, by which the apparatus may be plugged into the local circuit.

The circuit is diagrammatically shown or indicated in Fig. 20. Included in said circuit is a white light 139 and a red light 140, and at a suitable point in the circuit is a switch 141 which is adapted to be turned by the key that is to be kept in the exclusive charge of the inspector or some other official under whose supervision the election is held, and which corresponds to the key for the keyhole C of the form of apparatus shown in Figs. 1 to 13. The contact fingers 131, 132, 133, 134 rest against the film or sensitized sheet or paper 117 as the same passes about the metallic roll 116', as shown upon an enlarged scale in Fig. 18. So long as the said contact fingers are kept from actual contact with the metallic roll 116' by the film or sensitized sheet 117, neither light 139, 140 functions. When, however, the one in charge of the apparatus turns the film or sensitized sheet 117 so as to bring the sensitized area 125 thereof opposite the readings or indications 107 of Fig. 14, a circuit is completed through the contact fingers 133, 134 and the white light 139 flashes, thus showing that the sensitized area 125 of the film or sensitized sheet 117 is in position to receive a photographic impression through all the lenses 110 of all the readings or indicators or indications 107. After that exposure has been made by the act of the inspector in inserting a key in the switch 141 and turning the same so as to cause all the lights 122 to function just prior to the commencement of the election, the film or sensitized sheet 117 is turned further by the hand crank 121 to bring the non-sensitized area 126 of the film or sensitized sheet 117 opposite the readings or indicators 107 and at that time the contact fingers 131, 132 make contact through the two openings 130 with the metallic roll 116', thus causing the red light 140 to function, warning those in charge that a non-sensitized portion of the film or sensitized sheet 117 is opposite the readings or indications of the voting machine. At the close of the election, the proper official again turns the hand crank 121 so as to bring the sensitized area 127 of the film or sensitized sheet 117 opposite the readings of the voting machine, and this fact of the positioning of said sensitized area 127 is visually indicated by the flashing of the white light 139 because of the fact that the contact fingers 133, 134 complete the circuit through the openings 129 and the metallic roll 116'.

Then the inspector in charge again inserts his key in the switch 141, completing the circuit and thus causing all the lights 122 to function, and causing an exposure to be made upon the second sensitized area 127, which will therefore constitute a record of the readings or indications immediately at the close of the election. After the exposure has been made of said sensitized area 127, the one in charge completes the winding of the film or sensitized sheet 117 onto the take-up roll 116, but said roll cannot be removed from the apparatus without breaking the seal 142 which is provided, preferably in the form of a wire and lead seal, to prevent tampering with the photographic apparatus without leaving evidence of that fact.

Preferably the film or sensitized sheet 117, (as well as the films 26 shown best in Fig. 7) is of such size and so close to the back or face of the voting machine that no enlargement of the developed pictures is necessary, but our invention is not limited in this respect. Said sheets 26 and 117 may be photostat paper which, when developed, will constitute a photograph from which reproductions may be made.

By the structure shown in Figs. 14 to 21, certain of the methods disclosed in our Patent No. 2,034,441, March 17, 1936, may be practised.

It will be understood from the foregoing description that either by traversing a camera with a vertical bank of lenses across a voting machine both prior to and following an election involving the use of that voting machine, or by making two exposures through a multiplicity of lenses without relative traverse of the voting machine and the camera, we carry out the hereinbefore described process or method, and in so doing accomplish what has never heretofore been done with respect to voting machines, namely, secure an absolutely true record of all the votes for each candidate and/or subject, which is a photographic one so that no question can arise as to the accuracy of the result. It has heretofore been possible with all voting machines known to us to tamper with the readings or indications thereof, as, for example, by fraudulently moving the indicator prior to the commencement of the election. Any such fraudulent act would be prevented by our method, since a photographic record is made of the readings or indicators immediately preceding the election and another immediately at the close thereof, and such photographs can be made only by the inspector or other official having the key for closing the circuit 141, or the corresponding circuit of the apparatus shown in Figs. 1 to 13.

Obviously our method may be carried out otherwise than by means of the two types of apparatus herein disclosed. Obviously the voting machine, the indications of which are to be photographed, may be of various types or structures, just so it is of a type that may be used in an election during a day or some definite period with respect to a number of candidates and/or questions. Obviously a camera must be used in carrying out the method, but the method claimed could be carried out, though not so desirably, by a person holding or at least manipulating the camera close to the voting machine. The sealing of the sensitized strip or sheet is a manual step and the unsealing thereof is also a manual step. The sealing might be done in various ways. The moving of the sensitized strip or sheet specified in the claims may be done manually, and manual means for moving the strip or sheet is disclosed in that form of the apparatus shown in Figs. 14 to 19. The moving of the strip may be accomplished in many different ways. The structure of the camera itself may be widely varied. We have herein disclosed one type of camera in which there is a vertical bank of lenses and a second type in which there is one lens for each voting indication. The method herein claimed might, however, be carried out by using other arrangements of lenses or by some other number of lenses than as herein disclosed.

Having thus described certain apparatus whereby the method of our invention may be practised, it is to be understood that although specific terms are employed, they are used in a generic and descriptive sense and not for purposes of limitation, the scope of the invention being set forth in the following claims.

We claim:

1. That method of forestalling and preventing fraud by establishing for preservation a permanent, accurate, photographic record of the exact number of total votes that have been registered for each candidate and/or question voted on during a predetermined period of use by a relatively large number of voters upon a single voting machine displaying a large number of vote readings in a general rectangular arrangement, which method includes the following steps: exposing for photographic purposes the entire substantially rectangular face or part of a voting machine adapted to be used by a large number of voters during a single voting period (such as a day), which face or part has a substantially rectangular arrangement of indicators that separately register the votes for each candidate and/or question to be voted on during such single voting period; positioning in close proximity to the said face or part of the voting machine a sensitized film having non-sensitized leader and trailer ends, the sensitized portions of said film approximating in a direction transverse to its lengthwise extent the corresponding dimension of the said exposed face of the voting machine; moving said film for successive exposures past a multiplicity of photographic lenses adjacent thereto; photographing said face or part of the voting machine shortly prior to the commencement of the said voting period onto the portion of said film immediately succeeding the leading end thereof; again exposing for photographic purposes said entire face or part shortly following the close of said voting period; and again photographing but upon a succeeding part of said sensitized film, the resultant readings of the voting machine whereby, upon comparison of the said two photographic records, the total true vote for each candidate and/or question may be ascertained.

2. That method of forestalling and preventing fraud by establishing for preservation a permanent, accurate, photographic record of the exact number of total votes that have been registered for each candidate and/or question voted on during a predetermined period of use for one election by a relatively large number of voters upon a single voting machine displaying a large number of vote readings, filling a substantially plane area too large to be photographed through a single lens if in proximity thereto, which method includes the following steps: exposing for photographic purposes the entire face or part of a voting machine adapted to be used by a large number of voters during a single voting period (such as a day), which face or part has indicators that separately register the votes for each candidate and/or question to be voted on during such single voting period; feeding a single, large, sensitized sheet of sufficient length for two exposures and of sufficient width to accommodate photographic impressions thereon from said indicators in their respective arrangement through a multiplicity of lenses; photographing such face or part of said voting machine shortly prior to the commencement of the voting period by said multiplicity of lenses onto the leading sensitized portion of said single, large sheet and together including all said vote readings; again exposing for photographic purposes said entire face or part shortly following the close of said voting period, and again photographing said face or part through said multiplicity of lenses onto the trailing sensitized portion of said single sheet, whereby upon comparison of said two photograpic records the true total vote of each candidate and/or question may be ascertained.

WILLIAM H. PETIT.
EDSON S. HINELINE.